Aug. 8, 1967  P. MATTY  3,334,571
COFFEE MAKERS OR THE LIKE
Filed Feb. 14, 1964  3 Sheets-Sheet 1
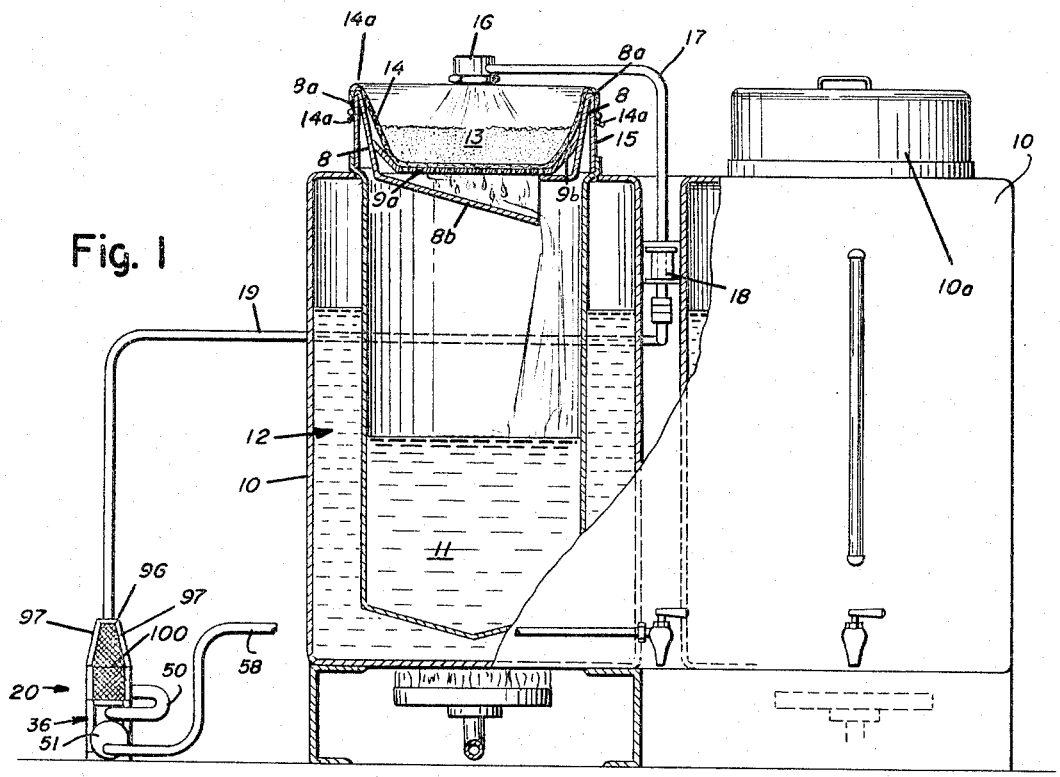
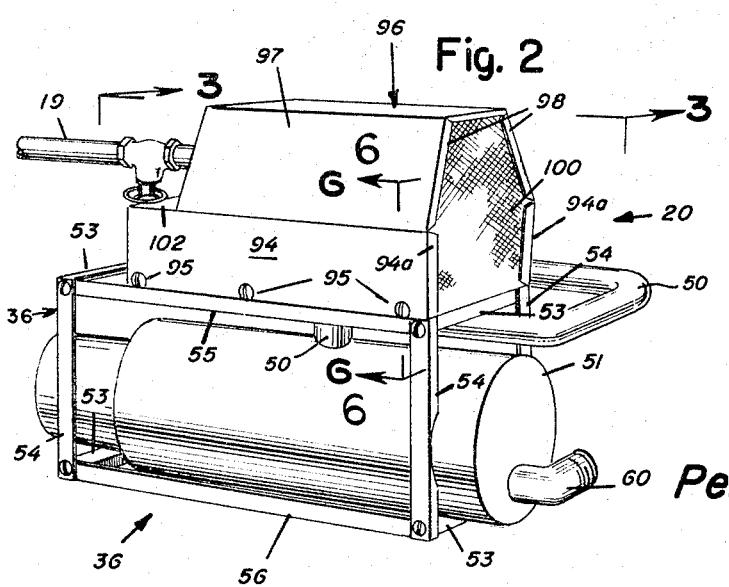
Pete Matty
INVENTOR
BY Eugene E. Stevens
Raymond H. Stevens
ATTORNEYS

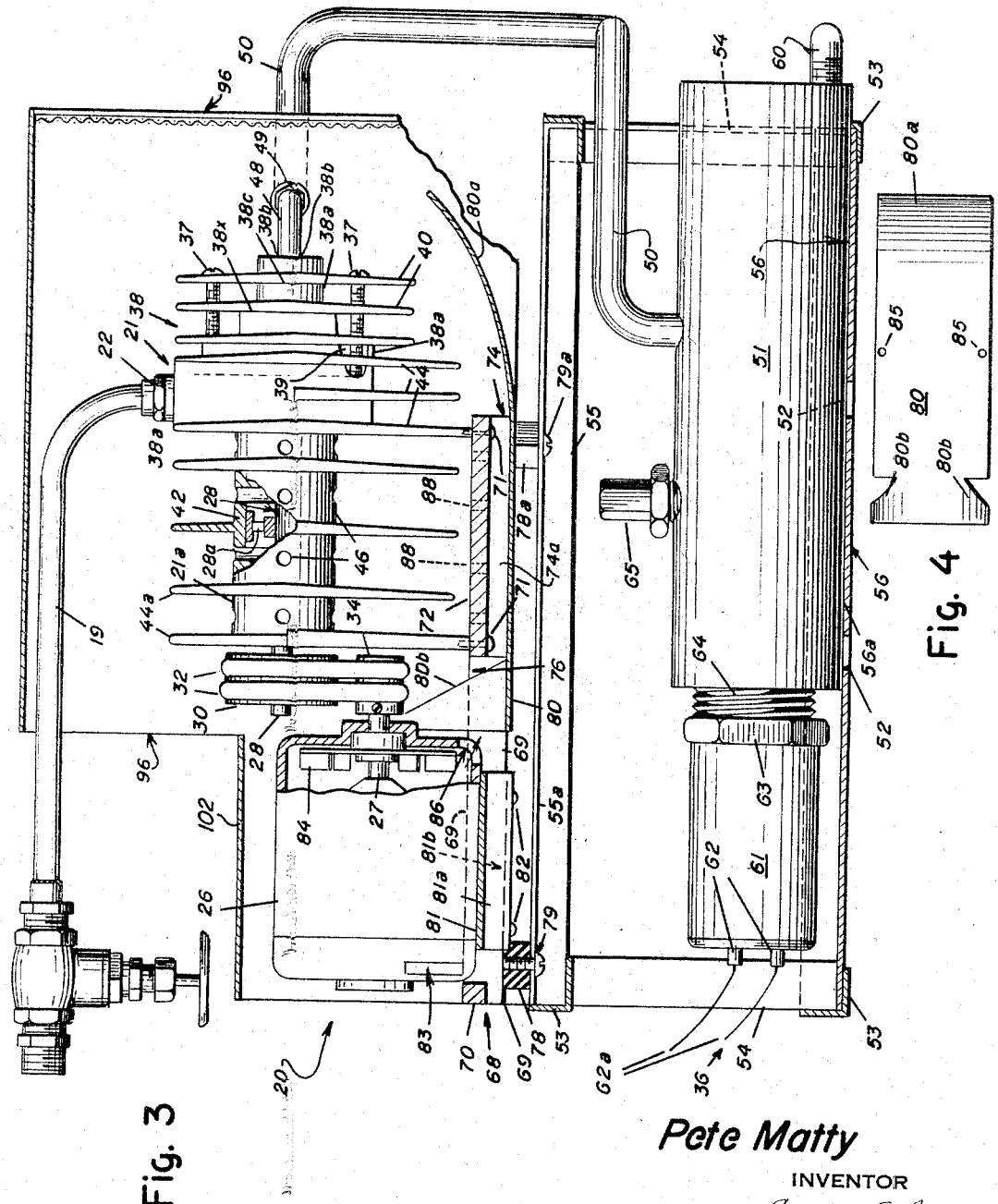

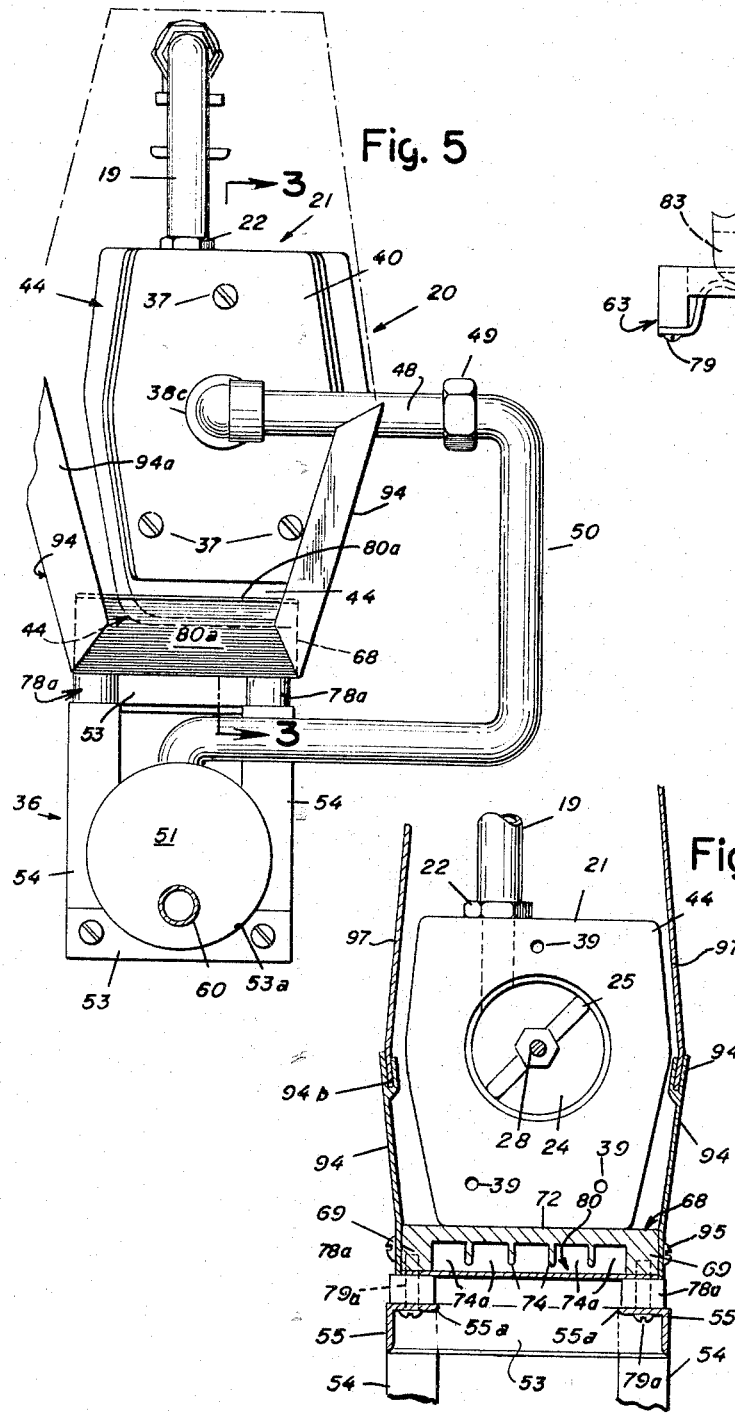

United States Patent Office 3,334,571
Patented Aug. 8, 1967

3,334,571
COFFEE MAKERS OR THE LIKE
Pete Matty, P.O. Box 73, Middletown, Va. 22645
Filed Feb. 14, 1964, Ser. No. 345,022
7 Claims. (Cl. 99—283)

Although not limited thereto, my invention relates primarily to large capacity coffee makers for restaurants and the like which include make-up water supply pumps, and it embodies improvements over the coffee maker of my Patent No. 3,085,880, dated Apr. 16, 1963.

In the coffee maker of my aforementioned patent, I provide in connection with its make-up water supply pump, a coolant fluid circuit which includes certain impeller chamber-adjacent areas of the make-up water supply pump, said coolant circuit also traversing portions of the pump shaft bearings and the lubricant-receiving chamber through which the rotary pump shaft extends.

Thus, the coolant fluid circuit of my aforementioned patent has proven highly efficient in service, in that it (1) prevents vapor locking due to the presence of steam in the pump; (2) maintains the efficiency of the pump lubricant by preventing overheating; and (3) prevents burning out of the pump shaft bearings and the pump shaft-carried seal which excludes lubricant from the impeller chamber of the pump. However, the use of a fluid coolant circuit made the patented device quite expensive to manufacture and also involved maintenance costs to some extent.

Present improvements

Therefore, one of the primary objects of the present invention is to provide a highly efficient coffee maker, which eliminates the expensive coolant circuit, by providing novel air cooling means for the make-up water pump and its shaft bearings, etc.

Another object is to assure that the make-up water delivered to the spray head for discharge over the ground coffee, while not overheated, is hot enough to make good coffee. Under some circumstances this was not possible using the coffee maker of my said prior patent. For instance, if the attendant forgot to fill the make-up water supplying urn jacket until just before making a batch of coffee, the initial make-up water temperature (say 165° F.) would be much too low. But even if the make-up water temperature in the urn of my said patent is, say 212° F., at the time the supply pump is started to make a quantity of coffee brew, the water temperature at the spray head over the ground coffee, at least at the start of the operation, would be too low for the making of a good brew. This is so because the pump-cooling coolant circuit flow of my prior coffee maker starts when the pump starts; and also since there will usually have been a substantial time lapse since the previous batch of brew was made, there will be a further make-up water temperature loss due to the fact that the pump of my said patent and its supply and discharge lines will be at room temperature.

Therefore, the present invention also has for an object, the incoporation of a thermostatically controlled heating unit with a casing-provided make-up water chamber which latter is in open communication with the pump, and is supplied from an urn jacket or other source, whereby the pump will be kept at make-up water temperature, so that make-up water at a predetermined desired temperature will always be available for making a quantity of coffee brew.

Another object of the invention is to provide a coffee maker which has means including a time-controlled pump for supplying a predetermined quantity of make-up water for each batch of ground coffee.

Also the invention aims to provide a novel supporting means for the ground coffee which will assure complete flavor-extraction therefrom.

Various other objects and advantages of the invention will be apparent to those versed in the art as the description proceeds, reference being had to the accompanying drawings.

Although the drawings illustrate a now preferred form of the invention, it is to be understood that the present disclosures should be taken as illustrative rather than limitative. This is so because the invention is obviously susceptible of other mechanical expressions within the scope of the subject matter claimed hereinafter.

In the drawings, wherein the same reference characters have been used to designate the same parts wherever they appear in the various views:

FIG. 1 is a front elevational view partly broken and partly in section illustrating a commercial coffee maker embodying my invention;

FIG. 2 is a perspective view of the combined heater-incorporating and motor-operated pump unit with the pump and its operating motor enclosed in a sectional casing, which latter provides air inlet and outlet means;

FIG. 3 is a vertical longitudinal sectional view through the line 3—3 of FIG. 2, with parts of the motor broken away to show an air propelling fan, the pump and heater being shown in the side elevation;

FIG. 4 is a top plan view of a cooling air-deflecting plate which is associated with the air-cooled pump and its drive motor as shown in FIG. 3;

FIG. 5 is an end elevational view of the combined pump and heater unit of FIG. 2 but with the screen element of the casing removed to expose the make-up water entry end of the pump;

FIG. 6 is a sectional detail taken on the line 6—6 of FIG. 2 showing the pump's impeller, its chamber and the make-up water outlet from the latter; and FIG. 7 is a detail view showing, in end elevation, a lower fragment of the motor and the mounting means therefor.

Referring to the drawings by reference characters and turning to FIG. 1, two conventional coffee urns 10 are shown in battery as usual and each provides an open topped coffee brew container 11 which is surrounded by a make-up water jacket 12. The cover 10a of one urn is shown as removed and replaced by the open topped tubular riser 15, the bottom of which is supported by the related urn top.

An open topped receptacle 8 has hook means 8a at its upper edge for suspending it within the riser 15; and its bottom has the sidewardly directed coffee brew discharging depression-defined coffee brew outlet spout 8b.

An exterior clamp ring 7 clamps the downturned mouth portion 14a of the ground coffee 13 containing bag 14 to the riser 15; and the bottom of the bag 14 is supported by the perforated bottom 9a of a pan 9 which has an enless upwardly and outwardly divergent side wall 9b. The novel function of the just recited combination of parts will be dealt with hereinafter.

The downwardly discharging hot make-up water spray head 16 which is shown as disposed above the open mouth of the coffee grounds containing bag 14 is carried by the L-shaped pipe 17. The stem of the L-form pipe 17 is rotatably journalled in the urn-carried bearing unit 18 and has connections with the makeup water supply pipe 19 which is supplied from the motor-incorporating pump unit which is generally designated by reference character 20.

Suitable switch means (not shown) but illustrated in my aforementioned patent is incorporated in bearing unit 18 to prevent operation of the hereinafter described drive motor 26 for the make-up water supply pump 21 except when spray head 16 is located over one or the other of the urns 10.

FIGS. 1, 3, 5 and 6 show that the make-up water supply pipe 19 has connection with outlet 22 of pump 21 that communicates with the chamber 24 for impeller 25, which chamber 24 (see FIG. 6) is located at the pump unit end which is remote from the drive motor 26 for impeller shaft 28. Impeller shaft 28 has pulleys 30 which are belt driven 32 from motor pulleys 34 of armature shaft 27; and both pump 21 and motor 26 are supported on the top of a rectangular frame 36 which will presently be described in detail.

The open end of the impeller chamber 24 of pump 21 is closed by the detachable plug-like portion 38a of a head 38 which preferably provides (FIG. 3) a progressively reduced extension of said impeller chamber 24. Pump head 38 also has the concentric fluid inlet portion 38b which is progressively stepped to greater exterior diameter as at 38c and 38x from adjacent its inlet end to a point adjacent the back surface of its chamber-engaging plug portion 38a so as to provide, along with plug portion 38, sustaining and spacing shoulders for heat disseminating fins 40 of great length and width as compared to related pump head 38 portions, and further reference will be shortly made to these fins 40.

Pump 21 includes a tubular extension 21a in the direction of motor 26, which extension 21a is substantially cross-sectionally oversized interiorly with respect to the impeller shaft 28 and provides interior bearings 28a therefor as indicated in FIG. 3. Both the impeller-chamber 24 providing portion of pump 21 and its tubular extension 21a are also provided with oversized exteriorly surrounding, and functionally integral, heat disseminating fins 44 and 44a, respectively, as indicated in FIG. 3.

Air inlet holes 46 in pump portion 21a between fins 44a cooperate with the latter in cooling impeller shaft bearings 28a.

The impeller chamber closing head 38, as well as the related heat-disseminating fins 40, are secured in assembly with pump 21 by elongated screws 37 which extend through fins 40 and whose inner ends engage in threaded holes 39 in the end of pump 21 or in the functionally integral end-adjacent fin 44 of the latter as shown in FIG. 3.

As to the spaced securing of the three illustrated pump-head 38 carried fins 40, FIG. 3 makes it clear that screws 37 draw the successive ones of this fin series against the outer end of the plug portion 38a of head 38 and the respective shoulders which are provided by the portions 38c, 38x of the fluid inlet portion 38b of said head. However, of course, there may and preferably will be brazing connecting fins 40 to head 38 for the purpose of better head dissemination.

The make-up water is supplied to the pump chamber 24 through the pipe 48 (see FIG. 5) which has the elbow connection 49 with the pipe 50 that communicates into the upper portion of a subjacent frame 36 carried cylindrical tank 51 as indicated in FIG. 5. The electrically heated cylindrical make-up water supply tank 51 is supported within frame 36 by lower cross members 52 and one of the lower frame end members 53; and is supplied from the urn jacket 12, or other source by way of pipe 58 to tank inlet elbow 60 (see FIG. 1).

As shown, frame 36 comprises upstanding corner posts 54 which are connected by top and bottom end members 53 and by top and bottom side rails 55, 56, respectively, all of which are preferably angle-form in cross section.

Referring to FIGS. 2 and 3, the heater 61 for tank 51 is conventional, having the binding posts 62 for circuit wires 62a and electrodes (not shown) which extend into tank 51. Heater 61 is threaded 64 into the open end of tank 51 and has the hexagonal portion 63 for the application of a wrench. A tank-carried standard and adjustable thermostat 65 controls heater 61 according to tank water temperature.

*The motor and pump-supporting base, etc.*

FIGS. 3 and 6 show that the motor 26 and pump 21, 21a are supported by a rectangular base member having depending side wall-providing flanges 69 which are connected at one end by cross bar 70 and at the other by a pump 21 supporting platform 72. The rear end of platform 72 terminates short of cross bar 70 to leave an open space 76 for motor 26 which is supported by side wall-providing flanges 69, as will be shortly explained.

FIG. 3 shows that the thickness of cross bar 70 is less than side flange 64 depth; and FIGS. 3 and 6 indicate the under surface of platform 72 as having coextensive laterally spaced flange 69 paralleling ribs 74 to define air passage channels 74a therebetween (see FIG. 6). The lower edges of flanges 69 and ribs 74 are preferably substantially co-planar as indicated.

The pump and motor-supporting base 68 of FIGS. 3 and 6 is supported by the upper side rail 55 provided horizontal flanges 55a of the tank and heater receiving frame 36 and is secured thereto by screws 79, 79a. Screws 79 extend upwardly from the under surfaces of flanges 55a through rubber or other cushioning disks 78 or 78a and into the bottoms of side flanges 69 of base 68.

FIGS. 3 and 6 also show screws 79a and cushioning disks 78a as securing in place a presently to be described combined air deflecting and closure plate 80 for the bottoms of the platform rib 74 provided channels 74a.

Pump 21 is secured to platform 72 by machine screws 71 which are threaded into the lower ends of certain of the heat-disseminating fins 44, 44a as indicated in FIG. 3.

As indicated in FIGS. 3 and 7, motor 26 has the base plate 81 with the depending side portions 81a that terminate in outward flanges 81b; and these latter are secured to the bottoms of base 68 provided side flanges 69 by screws 82.

*Air cooling of pump 21*

FIG. 3 indicates motor 26 as a known type which has rear casing openings 83 to supply air to the frontal armature shaft-carried fan or blower 84 which discharges an air blast through its casing front and bottom-provided opening 86.

Such motor fan 84 discharged air blast is here utilized in cooperation with pump provided fins 40, 44, 44a, the deflector platform 72 provided ribs and channels 74, 74a; and the aforementioned plate 80 of FIG. 3, 4, 5 and 6 for pump 21 cooling purposes.

In carrying out the pump 21 cooling phase of the invention, FIGS. 3 and 4 show the thin flexible metal plate 80 as having at each side of its narrowed motor-adjacent inner end, the upstanding air blast-confining wings. These wings are disposed on opposite sides of, and closely adjacent to, the air blast discharge opening 86 from the casting motor 26. Thus the cooling air blast from the fan or blower 84 is directed by plate 80 and its wings 80b forwardly through the rib 74 provided channels 74a.

Transverse holes 88 in platform 72 establish air communication between channels 74a and at least certain of the spaces between, or adjacent, pump ribs 44, 44a to materially help cool the latter; the impeller shaft bearings (not shown) and the inner end of the impeller chamber-providing portion of pump 21. FIG. 3 shows the outer end of platform 72 as terminating adjacent the plane of the inner portion of the impeller chamber-providing portion of pump 21; and that plate end portion 80a curves upwardly therefrom to direct cooling air against the pump and head-provided fins 44, 40.

Also to be noted from FIGS. 2, 3 and 6 is the fact that the sectional pump enclosure 94, 96, etc., best shown in FIGS. 2 and 3 and particularly the portions of side members 94 thereof in the region of upwardly inclined plate end portion 80a contribute materially to the cooling of pump 21 and its head 38.

The sectional pump enclosure

As best shown in FIGS. 2, 3 and 6, the pump 21 and the sides and top of the motor 26 are enclosed by a sectional casing or enclosure which includes, as base elements, the lower side members 94 which have inturned front end flanges 94a (FIG. 2) and are secured to the side flanges of the pump and motor supporting base 68 by screws 95. Longitudinally coextensive top grooves 94b (FIG. 6) of side members 94 receive the lower portions of the side wall 97 of an open ended top member 96.

The frontal ends of the top member-provided side walls 97 have inturned flanges 98 and these latter and flanges 94a are vertically grooved, or otherwise formed, to removably receive side portions of the frontal air outletting screen member 100 of FIG. 2. A suitable cover 102 for motor 26 rearwardly of top member 96 may be provided as indicated in FIGS. 2 and 3, and removably secured in any desired manner, as for instance, by engaging depending flange portions in the top grooves 94b of side wall members 94.

Having thus described my invention, what I claim is:

1. A make-up water supply unit for commercial coffee makers including on open topped brew-chamber providing urn for the support of a ground coffee container and which includes a make-up water delivery pipe for discharge onto the ground coffee; said unit comprising a make-up water supply tank, a pump discharging into said delivery pipe, a drive motor for said pump, said supply tank being in open communication with said pump and a make-up water supply source, an electric heater for said tank and connected thereto, a frame receiving said tank and providing a top portion, said motor and pump supported on the top portion of said tank-receiving frame, make-up water temperature controlled means connected to said heater, said motor including a blower discharging toward one end of said pump, said frame including a common base supporting said motor and pump, side walls secured to said base at each side of said pump for confining pressurized air therebetween and said base providing an open ended longitudinally extending channel into which a portion of the blower blast discharges, said pump having an impeller chamber-providing portion extending beyond the base end which is remote from the motor and blower, and a base-carried deflector at the discharge end of said channel and directing air blast therefrom against the impeller chamber-providing portion of said pump.

2. The structure of claim 1, and an impeller in said impeller chamber, an impeller drive shaft extending toward said motor and driven thereby, a shaft bearing and shaft-enclosing pump-providing housing having a longitudinally series of spaced apertures extending therethrough, outwardly extending heat disseminating fins carried by said shaft housing, and said base having parts communicating therethrough between said fins.

3. The structure of claim 2, and the impeller chamber-providing portion of said pump having outwardly extending heat disseminating fins.

4. A make-up water supply unit for commercial coffee makers which includes an open topped brew chamber-providing urn for the support of a ground coffee container and which includes a make-up water delivery pipe for discharge onto the ground coffee; said unit comprising a make-up water supply tank, a pump discharging into said discharge pipe, a drive motor for said pump, said supply tank being in open communication with said pump and a make-up water supply source, an electric heater for said tank and connected thereto, a frame receiving said tank and providing a top portion, said motor and pump being supported on the top portion of said tank-receiving frame, a forward and rear end portion providing common mount for said pump and motor and supported by the top portion of said tank-receiving frame, said mount having a transverse rear opening and a forwardly located pump-supporting platform beyond which the impeller chamber-providing pump portion extends, said motor secured upon said mount rearwardly of the forward end of said opening, a motor driven air blower located rearwardly of the forward opening end and discharging toward the proximate end of the pump and rear platform end, a longitudinal series of transversely disposed and laterally spaced exterior heat-disseminating fins carried by said pump, longitudinal laterally spaced heat-disseminating ribs provided by the under surface of said pump supporting platform, open ended air passage-providing channels constituted by the spaces between said ribs, a mount bottom-carried closure plate for the bottoms of said air channels, said closure plate having an upwardly inclined forward terminal extending beyond the forward platform end to discharge air toward the forwardly extending impeller chamber-providing pump portion, said pump-supporting platform having transverse apertures communicating therethrough from said channels, whereby to cool superjacent portions of the pump, said closure plate extending rearwardly of the platform toward the motor operated blower, and inclined side portions provided by the blower-adjacent plate end for direction blower air blast toward the pump, its mount, and the open rear ends of said air channels.

5. For use in the make-up water line of a coffee maker, a pump and a motor having an impeller chamber at one end, a frame having a make-up water tank thereon, said frame providing a top portion and a forward and rear end portion, said pump and motor being supported on a common mount on said top portion of said frame, said mount including a transverse rear opening and a forward pump-supporting platform beyond which said impeller chamber projects, said motor being secured upon said mount rearwardly of the forward end of said opening, a motor driven air blower rearwardly of the forwardly opening end and discharging toward the proximate end of the pump and the rear platform end, a series of longitudinal, transversely spaced, heat disseminating fins depending from the undersurface of said pump supporting platform and forming part of open-ended air passages providing channels between said ribs, a closure plate on said mount beneath said ribs and forming the lower side of said channels, said closure plate having an upwardly inclined forward end extending beyond the forward platform end for discharging air toward said impeller chamber, said pump-supporting platform having transverse apertures communicating therethrough from said channels for cooling superjacent portions of the pump, said closure plate extending rearwardly of the platform toward the motor-driven air blower and including side portions adjacent said blower for directing air toward the pump, the mount and rear ends of the channels.

6. The structure as claimed in claim 5 including an enclosure for said pump, said enclosure having substantially open ends and confining pressurized air about said pump and in said channels.

7. The structure as claimed in claim 6 in which said enclosure is detachably secured to said common mount.

References Cited

UNITED STATES PATENTS

| | | | |
|---|---|---|---|
| 1,635,006 | 7/1927 | Oliver | 230—211 X |
| 2,236,244 | 3/1941 | Cornelius | 230—211 X |
| 2,469,936 | 5/1949 | Tabbert | 230—211 X |
| 2,748,689 | 6/1956 | Rotman | 99—283 X |
| 2,880,664 | 4/1959 | Bagarozy | 99—302 |
| 3,085,880 | 4/1963 | Matty | 99—283 X |
| 3,087,415 | 4/1963 | Kaplan et al. | 99—281 |

WALTER A. SCHEEL, *Primary Examiner.*

IRVING BUNEVICH, *Examiner.*

S. P. FISHER, *Assistant Examiner.*